United States Patent [19]

Tan

[11] Patent Number: 4,656,628
[45] Date of Patent: Apr. 7, 1987

[54] DIGITAL SIGNAL TRANSMISSION SYSTEM
[75] Inventor: Yoichi Tan, Kanagawa, Japan
[73] Assignee: Fuji Xerox Co., Ltd., Tokyo, Japan
[21] Appl. No.: 437,599
[22] Filed: Oct. 29, 1982
[30] Foreign Application Priority Data
Oct. 30, 1981 [JP] Japan .................................. 56-172898
[51] Int. Cl.$^4$ ............................ H04J 3/02; H04J 3/24
[52] U.S. Cl. .......................................... 370/85; 370/94
[58] Field of Search .................. 370/85, 94, 60, 86, 370/89

[56] References Cited
U.S. PATENT DOCUMENTS

| 3,743,767 | 7/1973 | Bitzer et al. | 370/85 |
| 3,889,063 | 6/1975 | Slavin | 370/85 |
| 3,924,240 | 12/1975 | Given | 370/85 |
| 4,161,786 | 7/1979 | Hopkins et al. | 370/85 |
| 4,210,780 | 7/1980 | Hopkins et al. | 370/85 |
| 4,287,592 | 9/1981 | Paulish et al. | 370/94 |
| 4,380,761 | 4/1983 | Boggs | 370/85 |
| 4,408,323 | 10/1983 | Montgomery | 370/60 |

Primary Examiner—Douglas W. Olms
Assistant Examiner—Wellington Chin
Attorney, Agent, or Firm—Sughrue, Mion, Zinn, Macpeak & Seas

[57] ABSTRACT

A communication network includes a plurality of stations interconnected by a coaxial cable. Communication among stations is effected in packet form, the packets being located in blocks repeated periodically in time. At least one station may be provided with composing circuits effecting interconnection among several stations by linking transmitters and receivers of different stations. Alternatively, a separate central station acts to link an originating station with requested other stations in a manner such that channel connection among the linked stations is effected by a single packet.

9 Claims, 8 Drawing Figures

DIGITAL SIGNAL TRANSMISSION SYSTEM

BACKGROUND OF THE INVENTION

The present invention relates to a digital signal transmission system, for use in a communication system in which a digital signal is transmitted in a time division multiplexing mode over a communication cable, wherein sound transmission can be effected with multifunctions.

The basic sound transmission mode is a one-to-one communication mode using analog signals, in which subscriber lines are coupled by a line switching network, as typically represented by a common telephone system. This applies as well to a small-scale system, such as a private or premise communication network.

Meanwhile, it has been demanded that a telephone be made multifunctional in order to improve productivity in an office. The development of facsimile transmission through telephone lines is an example of such multifunctionality. In attaining such multifunctionality of the telephone, however, the basic transmission mode for conventional one-to-one communication must still be effected. Accordingly, for example, where one telephone line has been commonly used for both telephone and facsimile transmission it has been ordinary that the telephone line has been commonly, but exclusively, used. That is, ordinarily, the telephone could not be used during facsimile transmission, and vice versa. Further, where such a line has been connected between two or more subscribers, it has been ordinarily impossible for one of these subscribers to communicate directly with another. In this case, it has been necessary, for example, for one of the subscribers to establish a further communication channel using another telephone set and another line.

In the conventional sound transmission communication system whose basic transmission mode involves one-to-one communication, it has been difficult to sufficiently provide multifunctional sound transmission.

SUMMARY OF THE INVENTION

The present invention is intended to eliminate the above-mentioned drawbacks, and it is an object of the present invention to provide, particularly in a small-scale communication system, a digital signal transmission system in which multi-channel settings with respect to one station can be realized, and not only multifunctional telephone service but complex services for various equipment including terminal equipment can be attained.

According to the present invention, the above-mentioned object is attained in a manner such that a frame periodically repeated on a time axis is subdivided into blocks on the time axis so as to provide an opportunity of packet communication to each station by the block, to thereby enable real time transmission of signals such as sound signals to be effected even along with digital signals, and enable plural packets to be received by each station or by a predetermined station or enable one packet to be sent simultaneously to two or more stations, so as to enable one-to-N (N being an integer) communication to be attained.

DETAILED DESCRIPTION OF THE PREFERRED EMBODIMENTS

Figure 1:
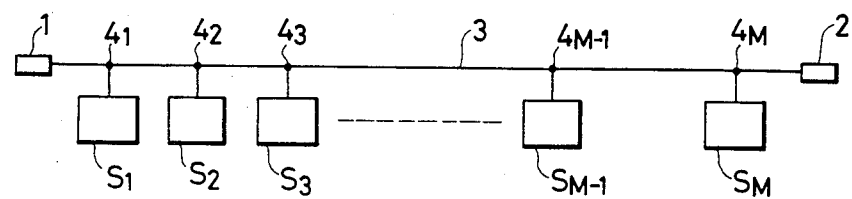
FIG. 1 is a schematic diagram illustrating the system configuration of a communication system.

FIG. 1 shows the configuration of a communication system employing the digital signal transmission system according to an embodiment of the present invention. In this system, stations or terminal equipment (hereinafter simply referred to as stations) $S_1$ to $S_M$ are connected through respective taps $4_1$ to $4_M$ to a coaxial cable 3 which is in turn connected at its ends to terminators 1 and 2. The coaxial cable 3 is, for example, a communication cable connecting respectively buildings of a laboratory and respective stations located in portions of each building.

Figure 2:
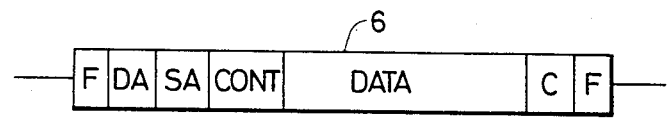
FIG. 2 is a schematic diagram illustrating a packet configuration transmitted/received by each station.

FIG. 2 shows the configuration of a packet to be sent/received by each station. A packet 6 is constituted by bit strings of ① a flag F, ② a destination address DA, ③ a sender address SA, ④ control information CONT, ⑤ transfer data DATA, and ⑥ an error checking code C. This configuration is basically similar to the frame configuration in the high-level data link control process (HDLC).

Figure 3:
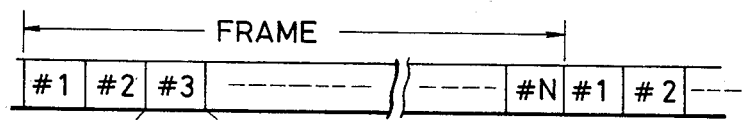
FIG. 3 is a schematic diagram illustrating the relation between the frame of a signal transmitted on a coaxial cable and a packet received by each station.

FIG. 3 shows the relation between the frame of a signal transmitted on a coaxial cable and a packet transmitted/received by each station. In this digital signal transmission system, a frame periodically repeated on the time axis is subdivided into N blocks #1 to #N, and one or more blocks are allocated to individual stations according to the amount of information to be transmitted by the stations, to allow each station an opportunity of packet communication. The timing of the sending-out of each packet 6 is controlled such that each packet 6 is located at the central portion of each block with a predetermined guard time $\tau g$ at opposite ends of the packet, in order to prevent packet collision due to the signal propagation delay time.

Assuming that the frame repetition period is 10 ms (milliseconds) and the amount of information which can be transferred by a packet constituting one block is 640 bits, a digital signal of 64 kbps (kilobits per second) may be successively transmitted by each packet in this communication system. Accordingly, sound signal transmission is made possible by converting sound or voice into digital signals through a conventional pulse code modulation (PCM) technique and transmitting the digital signals in the form of a packet in each frame. That is, one channel sound transmission may be achieved using one packet and therefore N channel sound transmission may be made using this communication system.

Figure 4:
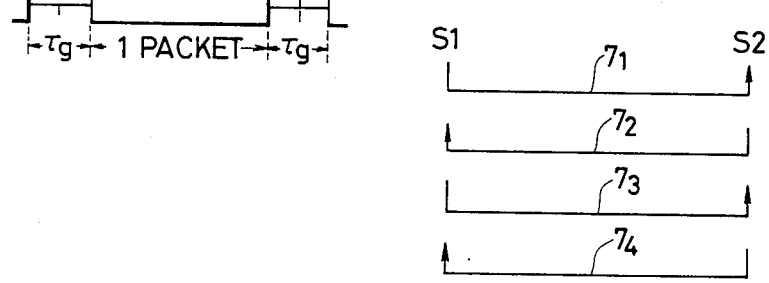
FIG. 4 is a schematic diagram of channel connection for explaining the establishment of two sets of incoming and outgoing channels between two stations.

Referring to FIG. 4, the case where one station $S_1$ calls another station $S_2$ and receives telephone service with this communication system will be explained. The user of station $S_1$ picks up the handset of the telephone set and dials the destination number of the station $S_2$. In station $S_1$, a talking register (not shown) is set by the action of a hook switch. The talking register in a given station is used in sending out a busy answer packet to any other station which calls the given station which is then busy. When the destination number of the station $S_2$ is dialed, such is described in the destination address DA of a packet then sent out as a telephone packet onto coaxial cable 3 through the tap $4_1$.

In this digital signal transmission system, no signal is transmitted on the coaxial cable 3 when no station effects a signal transmitting/receiving operation. That is, in such a status, no signal for providing a reference for each time or for indicating the subdivided positions of the respective blocks are transmitted. Therefore, the station which first transmits a signal (hereinafter referred to as the first station) is caused to take the initiative in frame and block synchronization. During the transmission operation of the first station, with the block length and frame synchronization agreed upon among the respective stations, each of the other stations establish block and frame synchronization on the basis of the packet from the first station, selects an empty block or blocks independently one from each other, and occupies the selected empty block or blocks for a necessary period of time to transmit its own signal. If the first station completes its communication in the course of signal transmission by any other station, the latter then takes the initiative with respect to frame synchronization, etc. from that time.

In the case where the station $S_1$ is not the first station, that is, after frame timing has been established in each station, the station $S_1$ must find an empty block or blocks in which to send out its own packet. Each station may select one or more empty blocks to begin sending its own packet on an equal basis, if there exist any empty blocks. Accordingly, for example, when the station $S_3$ begins to send its packet in the third block #3, there is a possibility that another station may begin to send out its own packet in the same third block #3, resulting in a collision between the packets. Each station is thus provided with a collision detecting circuit for detecting packet collision and upon the detection of a collision, stops sending its own packet. Any station which has stopped packet transmission then causes an intra-office random number generator to generate a random number and again begins to transmit its own packet after the lapse of a random time based on the generated random number. Of course, to avoid packet collisions, it suffices to set a priority order among the stations so that the station of higher priority between the concerned stations is allowed to continue its transmitting operation.

When the station $S_1$ succeeds in packet transmission, each of all the other stations $S_2$ to $S_4$ connected to the coaxial cable 3 receives the packet sent from the station $S_1$ and reads out the destination address DA on the basis of the flag F in the packet. Only that station whose destination number coincides with the contents of the read-out destination address DA fetches the packet sent from the station $S_1$. In the illustrated case, station $S_2$ fetches the packet from the calling station $S_1$. Thus, a telephone channel $7_1$ from the station $S_1$ to the station $S_2$ is established.

Now, the station $S_2$ reads out the control information CONT in the received packet. Based on the read-out, the station $S_2$ starts the bell of a telephone set ringing according to an answer request, to call the operator of the telephone set, and sends out an answer packet. If the station $S_2$ succeeds in sending out the answer packet onto the coaxial cable 3 and if the station $S_1$ receives this answer packet, another telephone channel $7_2$ is established.

Alternatively, if the station $S_2$ is busy with any station other than the station $S_1$, the talk register will have already been set when the station $S_2$ received the packet from the station $S_1$. In this case, the station $S_2$ sends out an answer packet including information representing a busy status to the station $S_1$ without causing bell ringing. Upon the receipt of this answer packet, the station $S_1$ produces a busy signal in the receiver of the telephone set to inform the caller of the busy status of the called station.

In the case where the transmitting and receiving telephone channels $7_1$ and $7_2$ are established between the two stations $S_1$ and $S_2$, each station may send its own sound or voice information as the transfer data DATA to begin conversation therebetween when the handset at the called station $S_2$ has been picked up. Assume now that it is desired to effect facsimile transmission at the same time between the stations $S_1$ and $S_2$ without interrupting the conversation therebetween. If there exists an empty block in a frame, for example, the station $S_1$ can send out a packet in the empty block to the station $S_2$. Upon the reception, a facsimile channel $7_3$ from the station $S_1$ to the station $S_2$ is established unless a facsimile register of the station $S_2$ has been previously set. At this time, if there exists a further empty block in the frame, the station $S_2$ can send out its answer packet to the station $S_1$ so as to establish an answering facsimile channel $7_4$ in a similar manner. Thus, sound or voice information transmission as well as facsimile transmission can be simultaneously effected between stations $S_1$ and $S_2$.

It will be appreciated from the above-mentioned explanation that the station $S_1$ can effect facsimile transmission to any station other than the station $S_2$ without interrupting the conversation between the stations $S_1$ and $S_2$ after the telephone channels $7_1$ and $7_2$ have been established. Further, the station $S_1$ may use the thus established facsimile channels $7_3$, $7_4$ between the station $S_1$ and any other station, e.g., $S_3$, (other than the station $S_2$) to effect telephone conversation. At this time, the user of the station $S_1$ may communicate with either the station $S_2$ or the other station $S_3$. In the case where the user of the station $S_1$ uses the same handset for both, it is necessary to partially modify the telephone set such that there is provided a composing circuit for composing the respective sound signals of the two stations, or a change-over switch for selecting stations, at the receiver side of the handset. The transmission information actually transmitted between stations is a digital signal in a transmission mode of the packet form. Accordingly, it is necessary to provide each channel with a coder and a decoder for conversion between analog and digital signals, a memory circuit for converting a fixed speed digital signal into a packet and reversely converting a packet into a digital signal, and a control circuit for controlling the conversion. In this embodiment, techniques are required for converting a PCM signal of 64 kbps by units of 640 bits, into a packet in which the signal is at a high bit rate, for example, equal to 10 Mbps. These techniques have been attained by current state of the art systems. Namely, with respect to the former, ICs known as PCM CODEC's are available, and with respect to the latter, the concerned techniques are widely practically used in packet exchanging techniques or the like.

Figure 5:
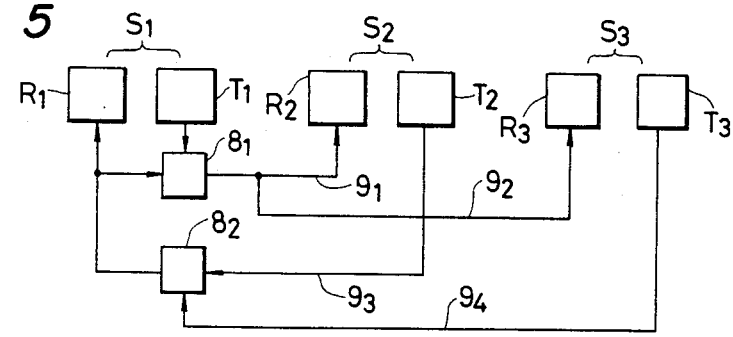
FIG. 5 is a schematic diagram of channel connection which enables conversation to be effected among three members.

FIG. 5 shows an example of channel connection which makes it possible to attain conversation among three stations, by expanding the above idea. In this case, the station $S_1$ is provided with two composing circuits $8_1$ and $8_2$. The station $S_1$ establishes first and second telephone channels $9_1$ and $9_2$ with the stations $S_1$ and $S_2$ respectively and sends out sound or voice information from its own transmitter $T_1$ to the respective receivers $R_2$ and $R_3$ of the stations $S_2$ and $S_3$ through the composing circuit $8_1$. In response, the stations $S_2$ and $S_3$ establish third and fourth telephone channels $9_3$ and $9_4$, respectively, both to the station $S_1$. The respective sound or voice information sent from transmitter $T_2$ and $T_3$ of the stations $S_2$ and $S_3$ is fed to the receiver $R_1$ of the station $S_1$ through the second composing circuit $8_2$ and is at the same time applied to the first composing circuit $8_1$. The sound or voice information produced from the first composing circuit $8_1$ is transmitted; as mentioned above, to the receivers $R_2$ and $R_3$ of the stations $S_2$ and $S_3$ respectively. In this manner, conversation among three stations is made possible.

Figure 6:
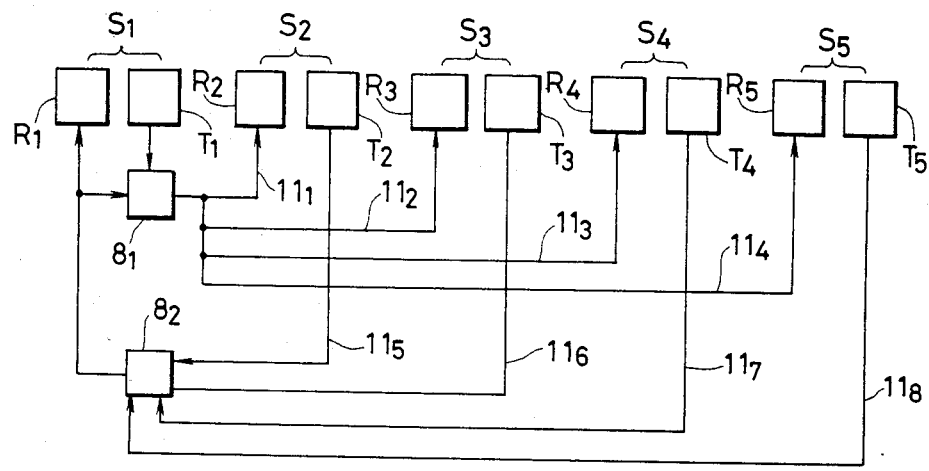
FIG. 6 is a schematic diagram of a first example of channel connection which enables conversation to be effected among five members.

Similarly, by expanding the channel connection it becomes possible to effect conversation among four or more stations. FIG. 6 shows an embodiment of channel connection in which conversation is made possible among five stations. Also in this case, the station $S_1$ is provided with two composing circuits $8_1$ and $8_2$ so that sound or voice information sent from the transmitter T of the station $S_1$ is applied onto first to fourth channels $11_1$ to $11_4$ through the first composing circuit $8_1$ and fed to the receivers $R_2$ to $R_5$ of the stations $S_2$ to $S_5$ respectively. Sound or voice information to be sent to the receiver $R_1$ of the station $S_1$ from the transmitters $T_2$ to $T_5$ of the stations $S_2$ to $S_5$ are applied to the second composing circuit $8_2$ through fifth to eighth telephone channels $11_5$ to $11_8$ and a part of the output of the second composing circuit $8_2$ is fed to the first composing circuit $8_1$, thus enabling conversation among the stations $S_1$ to $S_5$ to be effected.

In this example of channel connection, the station $S_1$ leads the other stations in operation and successively calls the other stations $S_2$ to $S_5$ to interconnect therebetween. Accordingly, it is necessary to provide in the stations $S_1$ not only two composing circuits but four sets, each including a decoder, an encoder and a memory circuit, for the respective four sets of coming and going channels. Thus, the station $S_1$ becomes a particularly equipped, special station. This means that it is impossible to effect inter-multistation conversation with such a channel connection configuration including no peculiar station.

Figure 7:
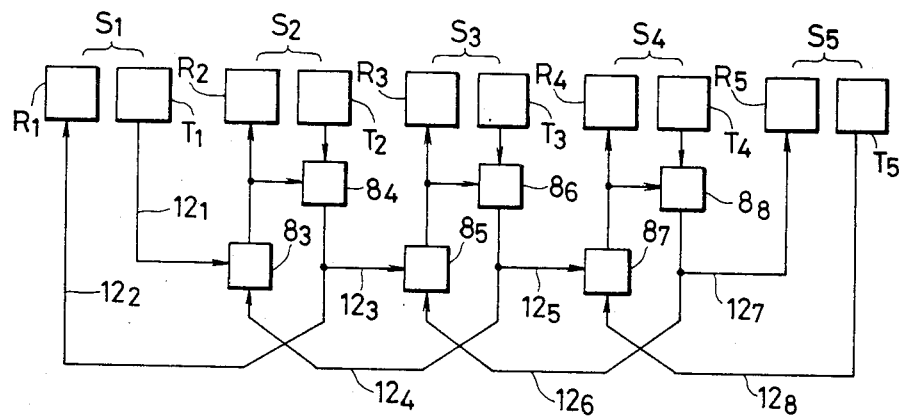
FIG. 7 is a schematic diagram of a second example of channel connection which enables conversation to be effected among five members.

FIG. 7 shows another embodiment in which conversation among multiple stations is made possible by providing two sets, each including a decoder, an encoder and a memory circuit, in each station. In this embodiment, when the station $S_1$ establishes first and second or coming and going telephone channels $12_1$ and $12_2$ between the stations $S_1$ and $S_2$, the station $S_2$ establishes third and fourth telephone channels $12_3$ and $12_4$ between the station $S_2$ and a station $S_3$ which desires to effect conversation theretogether. With this status, sound or voice information sent from the transmitter $T_1$ of the station $S_1$ through the first telephone channel $12_1$ is composed with the sound or voice information sent from the transmitter $T_3$ of the station $S_3$ through the fourth telephone channel $12_4$ by a third composing circuit $8_3$. The composite sound or voice information of the stations $S_1$ and $S_3$ is fed to the receiver $R_2$ of the station $S_2$ and is at the same time composed with the sound or voice information sent from the transmitter $T_2$ of the station $S_2$ by a fourth composing circuit $8_4$ provided in the station $S_2$. The thus composed sound or voice information of the stations $S_1$, $S_2$ and $S_3$ is fed not only to the receiver $R_1$ of the station $S_1$ but to the receiver $R_3$ of the station $S_3$ through fifth composing circuit $8_5$ provided in the station $S_3$. Thus, this connection configuration makes conversation among the three stations $S_1$ to $S_3$ possible.

Similarly, if the station $S_3$ establishes fifth coming and going telephone channels $12_5$ and $12_6$ between the station $S_3$ and a further station $S_4$, conversation among the four stations $S_1$ to $S_4$ is made possible by the similar functions of fifth and sixth composing circuits $8_5$ and $8_6$ provided at the station $S_3$. Further, if the station $S_4$ establishes seventh and eighth coming and going telephone channels $12_7$ and $12_8$, conversation among the five stations $S_1$ to $S_5$ is made possible by the function of seventh and eighth composing circuits $8_7$ and $8_8$ provided in the station $S_4$. Similarly, conversation among six or more stations is made possible by expanding the lines of such a channel connection configuration.

According to the connection configuration shown in FIG. 7, conversation among a desired number of stations is made possible by equally distributing calling stations so as to provide a minimum number of sets of coder, decoder and memory means in each station. In this case, however, if consideration is limited to the case of conversation among five stations, the total number of channels used is eight and equal to that shown in FIG. 6. That is, in either of the connection configurations of FIGS. 6 and 7, $2\times(k-1)$ channels are required for conversation among k stations, k being an integer equal to 2 or more.

Meanwhile, in this signal transmission system, the packet sent onto the coaxial cable 3 may be received by each of the stations. Accordingly, if arrangement is made such that each station can fetch packets received by plural particular stations, the packets for separtely transmitting the same sound or voice information to the plural particular stations can be replaced by a single packet, resulting in an economy of channels. For example, in the illustrated channel connection configuration, packets separately sent out through first to fourth channels $11_1$ to $11_4$ can be replaced by a single packet. Also in this case, however, it is unavoidable that the station $S_1$ becomes a peculiar one. As a solution of this problem, there can be provided a system in which a peculiar station is arranged to especially effect special functions and wherein each station commonly uses this peculiar station.

Figure 8:
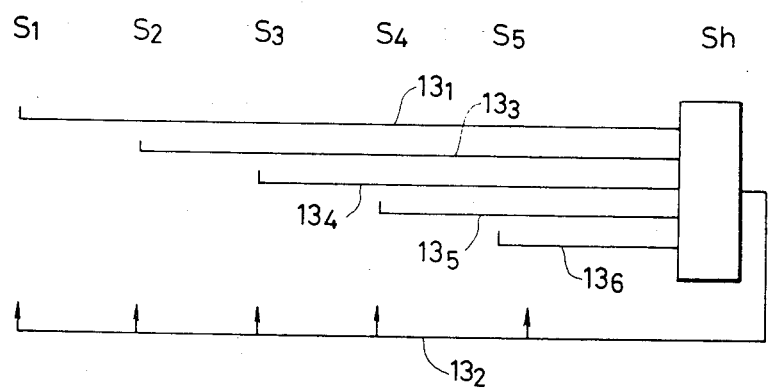
FIG. 8 is a schematic diagram of a third example of channel connection which enables conversation to be effected among five members.

FIG. 8 shows an example of such a communication system. A peculiar station $S_h$ serves to effect special functions when five other stations effect conversation thereamong. For example, assume now that station $S_1$ desires to effect conversation with four other stations $S_2$ to $S_5$. In this case, after depressing a particular button for inter-multistation conversation on the telephone set, the calling station $S_1$ successively dials the respective destination number of the peculiar station $S_h$ and the four stations $S_2$ to $S_5$ with which the station $S_1$ desires to effect conversation. Thus, the station $S_1$ forms a packet $13_1$ in which the destination code of the peculiar station $S_h$ is described in the destination address DA and the respective destination numbers of the stations $S_2$ to $S_5$ are arranged in this order and described in the transfer data DATA, and sends out the packet $13_1$ onto the coaxial cable 3.

This is a packet destined to the peculiar station $S_h$ from the station $S_1$. Having received the packet $13_1$, the peculiar station $S_h$ forms a packet $13_2$ in which a non-destination code (a specially agreed upon code which is different from the destination code of any one of the stations) is described in the destination address DA, and the respective destination numbers of the stations $S_1$ to $S_5$ which are desired to join the conversation are successively described in the transfer data DATA, and sends out the thus formed packet $13_2$ onto the coaxial cable 3. This packet $13_2$ is received by all the stations $S_1$ to $S_M$. Upon the detection of the non-destination code, each of all these stations $S_1$ to $S_M$ checks the contents of the transfer data DATA. Upon the respective detection of the destination numbers of the stations $S_1$ to $S_5$, each of these stations $S_1$ to $S_5$ stores the block number through which the packet $13_2$ has been transmitted. Thereafter, each of the stations $S_1$ to $S_5$ unconditionally fetches the block corresponding to this stored block number every time a frame is repeated. In this manner, channels for sending signals to all stations which desire to effect conversation with each other are effected using only one packet $13_2$.

Among the stations $S_1$ to $S_5$, the respective stations $S_2$ to $S_5$ requested to join the conversation with the originating party send their answer packets $13_3$ to $13_6$ to the peculiar station $S_h$ at the point in time when they begin to receive the packet $13_2$. In this manner, channel connection for the conversation among five stations is established. In each of the stations $S_2$ to $S_5$ requested to join the conversation, the intra-office bell is caused at this time to ring to call the user. If the respective users simultaneously pick up their handsets, the transfer data DATA which has thus far been used only for destination indication is replaced by a PCM signal for sound or voice transmission. Thus, theoretically, conversation among five stations can be realized by using only six channels without eliminating the equality among the stations $S_1$ to $S_5$. That is, in general, conversation among k stations can be realized using (k+1) channels, resulting in an economy of channels.

In the conversation system as shown in FIG. 8, however, the stations are not successively given an opportunity of answer, but are all simultaneously given the opportunity of answer. Accordingly, there arises a problem where some of the stations do not or cannot send out an answer because of their busy status or the like, and there is problem if all the called stations simultaneously send their answer.

To this end, there has been developed a solution utilizing the packet $13_2$ sent from the peculiar station $S_h$. That is, answer status of each of the stations $S_2$ to $S_5$ is relayed to the station $S_1$ which has proposed the conversation, using the packet $13_2$. The station $S_1$ sends out control information which causes the ringing of the station producing no answer to be stopped when the station gives up on joining this party, by inserting control information into the packet $13_1$. The station $S_h$ transfers this control information to the respective stations by means of the packet $13_2$. To attain this end, there are provided in the packet $13_2$ several bits of space at a portion after the positions where destination codes are successively located as the transfer data DATA so that a code representing the answer status of each station and a code for stopping calling may be inserted into this space.

Thus, conversation is initiated between the station which has proposed the conversation and the stations which have answered. In this case, it is important for each station to know who is now speaking among the members who are joining the conversation party. This fact may be relayed to each station using the control information CONT of the packet $13_2$, and indicated by a lamp display or the like.

Although the number of peculiar stations has not been particularly described in the above explanation, if a plurality of peculiar stations are set up, it is possible to separately effect several groups of intermultistation conversation or conference parties. In this case, each of the plural peculiar stations $S_h$ is regarded as common equipment, such as a council room. For a conference of many hours, it is effectual to provide terminal equipment as a speaker phone with which talk can be effected using no handset. The use of such terminal equipment will not cause any problem with channel connection.

Summarizing the above-mentioned points, if each station is provided with (i) a first channel (telephone channel) transceiver circuit for ordinary one-to-one communication and (ii) a second channel (for example, a facsimile channel) transceiver circuit and a composing circuit for additional service, and (iii) if a commonly used station such as a peculiar station $S_h$ is set up, for example, the following service modes can be realized:

(1) Simultaneous use of telephone and facsimile;
(2) Additional telephone calling and conversation among multiple stations;
(3) Conference/arrangement telephone;
(4) Interruption of a busy station;
(5) Transaction of other business in the midst of a conference;
(6) Additional calling of a new member in the midst of a conference;
(7) Distribution of conference materials by facsimile to all the members in the midst of a conference; and
(8) General calling of all of the stations by loudspeaker or liaison broadcast.

Among the eight modes mentioned above, modes (1), (2) and (3) have been already explained with respect to FIGS. 4, 5 and 8 respectively, and therefore, remaining modes (4), etc. will be explained hereunder.

(4) Interrupting a busy station:

Assume now that, for example, the station $S_1$ sends out a calling packet to the station $S_2$, which is now effecting conversation with station $S_3$ through a first channel. Then, a busy indication answer packet is sent back from station $S_2$ to the station $S_1$. Although the user of the station $S_1$ recognizes the busy status of the station $S_2$, he depresses an interruption request switch when he wishes interruption. This interruption request is transferred from the station $S_1$ to the station $S_2$ using the above-mentioned calling packet and an indication is generated to inform the user of the arrival of a new call. If the user of station $S_2$ intends to allow the interruption, she temporarily holds the conversation which she is now effecting and depresses a switch for selecting a second channel. Thus, conversation between the stations $S_1$ and $S_2$ is made possible.

(5) Transaction of other business in the midst of a conference:

As seen from FIG. 8, each station uses only one channel during the conversation. Accordingly, it is possible to effect transaction of other business by separately generating a call using another channel which is not then being used. This is an application of the above-mentioned mode (2) "additional telephone calling and conversation among multiple stations." Since the channel established for the conference is alive even during the transaction of other business, it is possible to use the second channel while, for example, simultaneously listening to the progress of the conference. In this case, the transmitter is connected to the second channel for transaction of other business and the receiver is connected to a compsing circuit for composing the respective outputs of the first and second channels.

(6) Additional calling of a new member in the midst of a conversation:

Assume now that, for example, a conference is being effected among the five stations $S_1$ to $S_5$ through the peculiar station $S_h$. If it is desired to add another station $S_6$ as a new member in this situation, for example, the station $S_1$ sends a calling packet to the station $S_6$. If the station $S_6$ answers this call, the station $S_1$ instructs the station $S_6$ to transfer its answer packet to the peculiar station $S_h$. When the station $S_6$ calls the peculiar station $S_h$, the packet from the station $S_6$ to the station $S_1$ is converted into a packet to the peculiar station $S_h$. Upon the reception of this packet, the peculiar station $S_h$ causes its composing circuit to compose the packet with the signals from the stations $S_1$ to $S_5$. Upon the reception of the packet $13_2$ sent from the peculiar station $S_h$, the station $S_1$ stops sending the packet to the station $S_6$. At this time, the station $S_6$ finds the packet in which the sender information SA represents the destination number of the peculiar station $S_h$ and fetches it thereinto. Thus, the packet from the peculiar station $S_h$ to the respective stations $S_1$ to $S_5$ becomes effective as the packet to the stations $S_1$ to $S_5$ and the newly added station $S_6$.

(7) Distribution of conference materials to all the members by facsimile in the midst of a conference:

In this case, the channel connection as shown in FIG. 8 is completed by using the unused second channel of each station effecting the conference and another unused peculiar station (common use station) $S_i$ according to the same process described above. By the thus completed channel connection, facsimile transmission can be effected from each station to the members joining the conference. In this case, it is necessary to exchange information for facsimile control among the respective stations before or after the picture signal transmission. To this end, it will suffice that the transmitting station successively selects the other stations one by one to effect the control information exchange and the picture signal transmission. Of course, if picture signal transmission is simultaneously effected to all the stations while only the control information exchange is made separately from one station to another, the facsimile transmission will become more effectual.

In the above explanation, a transmission installation using telephone lines is assumed as a facsimile installation. Of course, however, techniques such that picture signals are processed in the form of digital signals has been used in the conventional facsimile technique. Accordingly, if such digitalized picture signals are applied to the system according to the present invention, it becomes possible to eliminate means for effecting matching to telephone lines, such as a modulator/demodulator, a coder and a decoder. Further since the loss in the amount of information due to signal conversion by such parts for communication can be obviated, it becomes possible to effect more effectual signal transmission. The current maximum transmission rate of telephone facsimile is 9.6 kbps. This value is about 1/6.7 of the digital signal transmission rate of 67 kbps of one sound channel. Accordingly, if a digital picture signal is directly input to the system according to the invention, it becomes possible to effect picture transmission with a transmission rate of 6.7 times the current telephone facsimile maximum rate.

(8) General calling of all stations by loudspeaker or liaison broadcast:

In this digital signal transmission system, a packet can be received by all stations connected to the same coaxial cable. Accordingly, for example, if a loudspeaker is provided at each receiving station so that a sound or voice packet sent from a transmitting station can be reproduced and decoded in each receiving station, sound or voice can be produced by the loudspeaker at each station. Thus, it becomes possible to effect a liaison broadcast or a call broadcast for calling the user to the telephone set. A person who has been called by the call broadcast may answer from a nearby station through ordinary telephone processes.

As explained above in detail, according to the present invention, in an inter-multistation communication network in which a digital signal is transmitted/received in a time-division-multiplex/line-switching mode by using a packet sent out by blocks timed with a frame periodically repeated on a communication cable, at least one station in the network fetches respective packets sent from plural stations and reproduces the packet as digital signal independently one from another, and/or a single kind of digital signal is sent out by a single packet simultaneously to plural stations, whereby various additional services can be made as follows:

(1) Simultaneous use of telephone and facsimile (In this case, transmission can be made to the same or different destinations);
(2) Doubling of one-to-one telephone communication and conversation among three or more members;
(3) Conference by three or more members;
(4) Interruption of a busy station;
(5) Transaction of other business in the midst of a conversation or conference between two or more members;
(6) Additional calling in the midst of a conversation or conference between two members;
(7) Distribution of conference materials to conference members in the midst of a conference; and
(8) Simultaneous calling for all stations, or liaison broadcast, using a loudspeaker.

What is claimed is:

1. In an inter-multistation communication network in which a digital signal transmitted on a communication cable is located fixedly in a frame periodically repeated on a time axis, the frame being subdivided into blocks on the time axis, so that each of plural stations is given a digital signal transmission opportunity to enable each station to effect signal transmitting/receiving operations in packet form in a time division multiplexing and line switching mode, a digital signal transmission system, comprising, at least one station having means for receiving packets sent from plural stations to thereby establish plural TDM channels simultaneously with said plural stations, respectively, and means for reproducing said packets from said plural stations into plural, independent digital signals respectively to establish plural TDM channels simultaneously with said plural stations, respectively, and a station for sending a digital signal in a single packet to plural stations in a simultaneous calling mode, such that at least one station in said network effects digital signal real time transmission between said station and other plural stations.

2. In an inter-multistation communication network in which a digital signal transmitted on a communication cable is located fixedly in a frame periodically repeated on a time axis, the frame being subdivided into blocks on the time axis, so that each of plural stations is given a digital signal transmission opportunity to enable each station to effect signal transmitting/receiving operations in packet form in a time division multiplexing and line switching mode, a digital signal transmission system, comprising, at least one station having means for receiving packets sent from plural stations to thereby establish plural TDM channels simultaneously with said plural stations, respectively, and means for reproducing said packets from said plural stations into plural, independent digital signals respectively to establish plural TDM channels simultaneously with said plural stations, respectively.

3. A digital signal transmission system according to claims 1 or 2, including a station comprising at least two sets of devices each including a coder for converting an analog signal into a digital signal and a decoder for reversely converting a digital signal into an analog signal, said station receiving plural packets and transmitting packets to plural stations.

4. A digital signal transmission system according to claim 3, including at least coders for converting an analog signal into digital signals of at least two kinds.

5. A digital signal transmission system according to claims 1 or 2, including coder means in which an analog signal is converted into digital information which is in turn sent out as a packet to plural stations.

6. A digital signal transmission system according to claims 1 or 2, wherein a station first transmitting a packet signal initiates frame timing in said network, frame timing being continued by any other station then transmitting at the time when transmission from said first station ceases.

7. A digital signal transmission system according to claims 1 or 2, each station including packet collision detection means, said detection means effecting stoppage of packet transmission from a respective station upon packet collision, and again permitting transmission after a random waiting time.

8. A digital signal transmission system according to claims 1 or 2, said station comprising a common station used by each of said other plural stations, said common station transmitting a packet signal to all of said plural stations including a non-destination code and destination addresses of stations to be communicatively linked, to establish communication channels between said stations, upon receiving a request from any station, communication channels between communicatively linked stations being effected by a single packet.

9. In an inter-multistation communication network in which a digital signal transmitted on a communication cable is located fixedly in a frame periodically repeated on a time axis, the frame being subdivided into blocks on the time axis, so that each of plural stations is given a digital signal transmission opportunity to enable each station to effect signal transmitting/receiving operations in packet form in a time division multiplexing and line switching mode, a digital signal transmission system, comprising, a station for sending a digital signal in a single packet to plural stations in a simultaneous calling mode, such that at least one station in said network effects digital signal real time transmission between said station and other plural stations.

* * * * *